Patented Feb. 12, 1952

2,585,553

UNITED STATES PATENT OFFICE 2,585,553

METHOD FOR PRODUCING STEROID ESTERS

Max Niel Huffman, Dallas, Tex., assignor to G. D. Searle & Co., Chicago, Ill., a corporation of Illinois No Drawing. Application February 19, 1949, Serial No. 77,451

4 Claims. (Cl. 260—397.2)

This invention relates to methods of converting steroid ethers to steroid acetates and related steroid esters.

This application is a continuation-in-part of my copending application Serial No. 34,144, filed June 19, 1948.

I have discovered that steroid ethers, such as cholesteryl methyl ether, cholesteryl butyl ether, cholesteryl benzyl ether, and androstenetriol 3-methyl ether diacetate, can be converted to the corresponding esters, viz., cholesteryl acetate or androstenetriol triacetate, by reaction with acetic anhydride and an aromatic sulfonic acid such as p-toluenesulfonic acid.

In a similar fashion other steroid ethers may be converted to the corresponding steroid esters by reaction in the presence of aromatic sulfonic acids with other acylating agents, as for example, propionic anhydride, benzoic anhydride, benzoyl chloride, butyryl chloride and the like.

My invention is disclosed in detail by the following examples, which are provided merely as illustrations and which are not to be construed as limiting the invention in spirit or scope.

Example 1

0.50 gram of cholesteryl methyl ether and 0.25 g. p-toluenesulfonic acid monohydrate are covered with 25 cc. of redistilled acetic anhydride and heated on a steam bath with frequent stirring for 30 minutes. The reaction solution is chilled. After about 24 hours, five crystals of cholesteryl acetate are collected on a filter, washed with 90% acetic acid and then with water, and dried in vacuo (yield: 0.37 g.). They melt at 113–113.5° C. and do not depress the melting point of authentic cholesteryl acetate.

Example 2

To 301 milligrams of urinary androstenetriol 3-methyl ether (Hirschmann's triol, M. P. 195–196° C.) dissolved in 5 cc. of dry pyridine are added 3 cc. of acetic anhydride. The two phases are well mixed and left for 24 hours with occasional swirling. The androstenetriol 3-methyl ether diacetate is then precipitated by treatment with 200 cc. of ice water and, finally, after 3 hours in the ice box, filtered and washed copiously with water.

To the air-dried diacetate (as above) are added 186 mg. of p-toluenesulfonic acid monohydrate and the solid materials are covered with 18.6 cc. of redistilled acetic anhydride. The mixture is heated on a steam bath with frequent stirring for 30 minutes and then cooled in an ice bath. As no crystallization of triacetate occurs within 3 hours time, the anhydride is decomposed with ice water and the steroid extracted with ethyl ether. The ether, after washing with aqueous sodium bicarbonate and with water, is dried and then evaporated to produce the androstenetriol triacetate. The resulting white residue may be recrystallized from aqueous ethanol (one time with the aid of charcoal) to yield 249 mg. of white plates, M. P. 183–185° C.

All filtrates from the recrystallizations of triol triacetate are added to ether and the ethereal solution washed several times with water. After evaporation of this ether, the resulting crystalline residue is dissolved in 25 cc. of ethanol, 25 cc. of 1.0 N potassium hydroxide are then added, and the alkaline solution is refluxed for 30 minutes. Following the addition of 25 cc. of water, the saponification medium is distilled until it becomes turbid. The free triol is allowed to crystallize for 2 days in the ice box and then filtered and washed well with water (100 mg., melting at 250–252° C.). This material may be recrystallized once from aqueous ethanol, once from absolute acetone, and again from aqueous ethanol to produce the triol crystallized as hexagonal plates with one-half molecule of water.

I claim:

1. The method of converting a steroid ether to a normal steroid ester which comprises reacting said steroid ether with an acylating agent in the presence of a catalytic amount of an aromatic sulfonic acid.

2. The method of converting a steroid ether to a normal steroid acetate which comprises reacting said steroid ether with acetic anhydride in the presence of a catalytic amount of an aromatic sulfonic acid.

3. The method of converting cholesteryl methyl ether to normal cholesteryl acetate which comprises reacting cholesteryl methyl ether with acetic anhydride in the presence of a catalytic amount of p-toluenesulfonic acid.

4. The method of converting androstenetriol 3-methyl ether diacetate to normal androstenetriol triacetate which comprises reacting androstenetriol 3-methyl ether diacetate with acetic anhydride in the presence of a catalytic amount of p-toluenesulfonic acid.

MAX NIEL HUFFMAN.

REFERENCES CITED

The following references are of record in the file of this patent:

UNITED STATES PATENTS

| Number | Name | Date |
| --- | --- | --- |
| 2,030,835 | Cox | Feb. 11, 1936 |

OTHER REFERENCES

Page, Biochem. Zeit. 220, 304–326 (1930).